United States Patent
Yao et al.

[11] Patent Number: 6,067,636
[45] Date of Patent: *May 23, 2000

[54] REAL TIME STREAM SERVER USING DISK DEVICE DATA RESTORATION SCHEME

[75] Inventors: Hiroshi Yao; Tatsunori Kanai; Toshiki Kizu, all of Kanagawa-ken; Seiji Maeda, Tokyo, all of Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/712,966

[22] Filed: Sep. 12, 1996

[30] Foreign Application Priority Data

Sep. 12, 1995 [JP] Japan .............................. P07-234403
Aug. 7, 1996 [JP] Japan .............................. P08-208648

[51] Int. Cl.$^7$ .......................... H02H 3/05; H03K 19/003
[52] U.S. Cl. ................................ 714/15; 714/6; 714/16; 714/764
[58] Field of Search .............................. 395/182.13, 181, 395/182.04, 182.14, 182.18, 182.16, 182.05, 872; 371/102, 20.1, 40.11, 40.2, 40.4, 51.1; 711/133, 134, 141, 151, 158, 159, 165, 166, 113–114; 714/14, 1, 6, 16, 18, 20

[56] References Cited

U.S. PATENT DOCUMENTS

| | | | |
|---|---|---|---|
| 5,398,253 | 3/1995 | Gordon | 371/40.4 |
| 5,418,925 | 5/1995 | DeMoss et al. | 711/114 |
| 5,457,791 | 10/1995 | Matsumoto et al. | 395/182.03 |
| 5,522,031 | 5/1996 | Ellis et al. | 395/182.04 |
| 5,537,566 | 7/1996 | Konno et al. | 711/114 |
| 5,592,612 | 1/1997 | Birk | 395/182.04 |
| 5,623,595 | 4/1997 | Bailey | 395/182.04 |
| 5,640,597 | 6/1997 | Noguchi et al. | 395/841 |

*Primary Examiner*—Dieu-Minh T. Le
*Attorney, Agent, or Firm*—Foley & Lardner

[57] ABSTRACT

A real time stream server using a disk device data restoration scheme, capable of shortening a restoration time by maximally utilizing the available stream resources, while providing the same service as in a case of normal operation, without setting any limitation on a new stream connection request during the restoration of lost data of a disabled disk device on a spare disk. The operations of the real time stream server is controlled by using normal streams for data transfer and restoration streams for data restoration, where as many stream resources as necessary are allocated to the normal streams first, and then at least a part of remaining stream resources are allocated to the restoration streams.

22 Claims, 7 Drawing Sheets

REAL TIME STREAM SERVER USING DISK DEVICE DATA RESTORATION SCHEME

BACKGROUND OF THE INVENTION

1. Field of the Invention

The present invention relates to a scheme for restoring lost data of a disabled disk device in a real time stream server without affecting a supply of real time stream data from a real time stream server to clients.

2. Description of the Background Art

Data to be sequentially transferred in real time such as video data and speech data are generally called "real time stream data". For a real time stream server for handling such real time stream data, a necessary condition is that it should be able to transfer the real time stream data stored in disk devices to each client while guaranteeing a continuity in real time.

In order to satisfy this condition, in the prior art, the real time stream data are stored in a data storage unit by being divided into blocks of a size to be transferred in a prescribed period of time, and the server makes accesses to the data storage unit periodically for each stream. The read out blocks are stored in a buffer memory once, and periodically transferred to corresponding clients through a communication network. A control device manages timings in this operation, while establishing a new stream channel upon receiving a connection request from a client.

Here, it is necessary for the data storage unit to store a large amount of data and transfer data at high speed, so that a striping technique is usually employed for the data storage unit, where a disk array device formed by combining a plurality of disk devices is provided and data are sequentially stored over all the disk devices by being divided into small blocks.

As a technique for enabling data restoration in the disk array, the RAID (Redundant Arrays of Inexpensive Disks) is well known. In the RAID, a logical disk group is formed by providing one parity disk for each group of a certain number of data disks. Then, data to be stored are divided into small blocks in some prescribed manner, and each block is stored by being divided into as many segments as a number of data disks in each group, while a parity data given by the exclusive OR of data segments is calculated for each block and stored into a parity disk. With this arrangement, even when one disk device in a disk group is disabled, it is possible to restore data of a disabled data disk from the other remaining data disks and the parity disk.

In addition, the real time stream server is required to be capable of continuing a supply of a connected stream, and restoring data without stopping the server operation, even when a disk device is disabled. For this reason, for the data storage unit of the real time stream server, a fault detection means for detecting a disabled disk device and a disk device exchange means for exchanging disks during the server operation are provided.

Now, in a case of actually restoring data, the stream resources such as disk access, buffer memory, etc. are required for the purpose of data restoration, in addition to those required for a normal supply of stream.

Conventionally, some stream resources are reserved exclusively for a restoration stream, and at a time of data restoration, these reserved stream resources are allocated to the restoration stream in order to carry out the data restoration. For this reason, there has been a drawback in that a maximum number of stream supplies during the restoration is limited rather low. In addition, which stream resources are to be reserved is fixedly set up in advance, so that when an actual number of stream supplies is small, even if many stream resources not allocated to any stream are available, it has been impossible to shorten a restoration time required for restoring data by efficiently utilizing all these available stream resources.

SUMMARY OF THE INVENTION

It is therefore an object of the present invention to provide a real time stream server using a disk device data restoration scheme, capable of shortening a restoration time by maximally utilizing the available stream resources, while providing the same service as in a case of normal operation, without setting any limitation on a new stream connection request during the restoration of lost data of a disabled disk device on a spare disk.

According to one aspect of the present invention there is provided a real time stream server, comprising: a data storage unit having a plurality of disk devices for storing each block constituting stream data, each block being formed by a prescribed number of data segments and a parity segment which are stored in different disk devices; a buffer memory for temporarily storing the stream data read out from the data storage unit; transfer means for transferring the stream data from the buffer memory to a client through a network; data restoration means for restoring a segment stored in a disabled disk device and writing restored segment into a replacement disk device; and control means for controlling operations of the transfer means and the data restoration means by using normal streams for data transfer and restoration streams for data restoration, wherein the control means allocates as many stream resources as necessary to the normal streams first and then allocates at least a part of remaining stream resources to the restoration streams.

According to another aspect of the present invention there is provided a method for controlling a real time stream server formed by: a data storage unit having a plurality of disk devices for storing each block constituting stream data, each block being formed by a prescribed number of data segments and a parity segment which are stored in different disk devices; a buffer memory for temporarily storing the stream data read out from the data storage unit; transfer means for transferring the stream data from the buffer memory to a client through a network; data restoration means for restoring a segment stored in a disabled disk device and writing restored segment into a replacement disk device; the method comprising the steps of: controlling operations of the transfer means and the data restoration means by using normal streams for data transfer and restoration streams for data restoration; and allocating as many stream resources as necessary to the normal streams first, and then allocating at least a part of remaining stream resources to the restoration streams.

Other features and advantages of the present invention will become apparent from the following description taken in conjunction with the accompanying drawings.

DETAILED DESCRIPTION OF THE PREFERRED EMBODIMENTS

Figure 1:
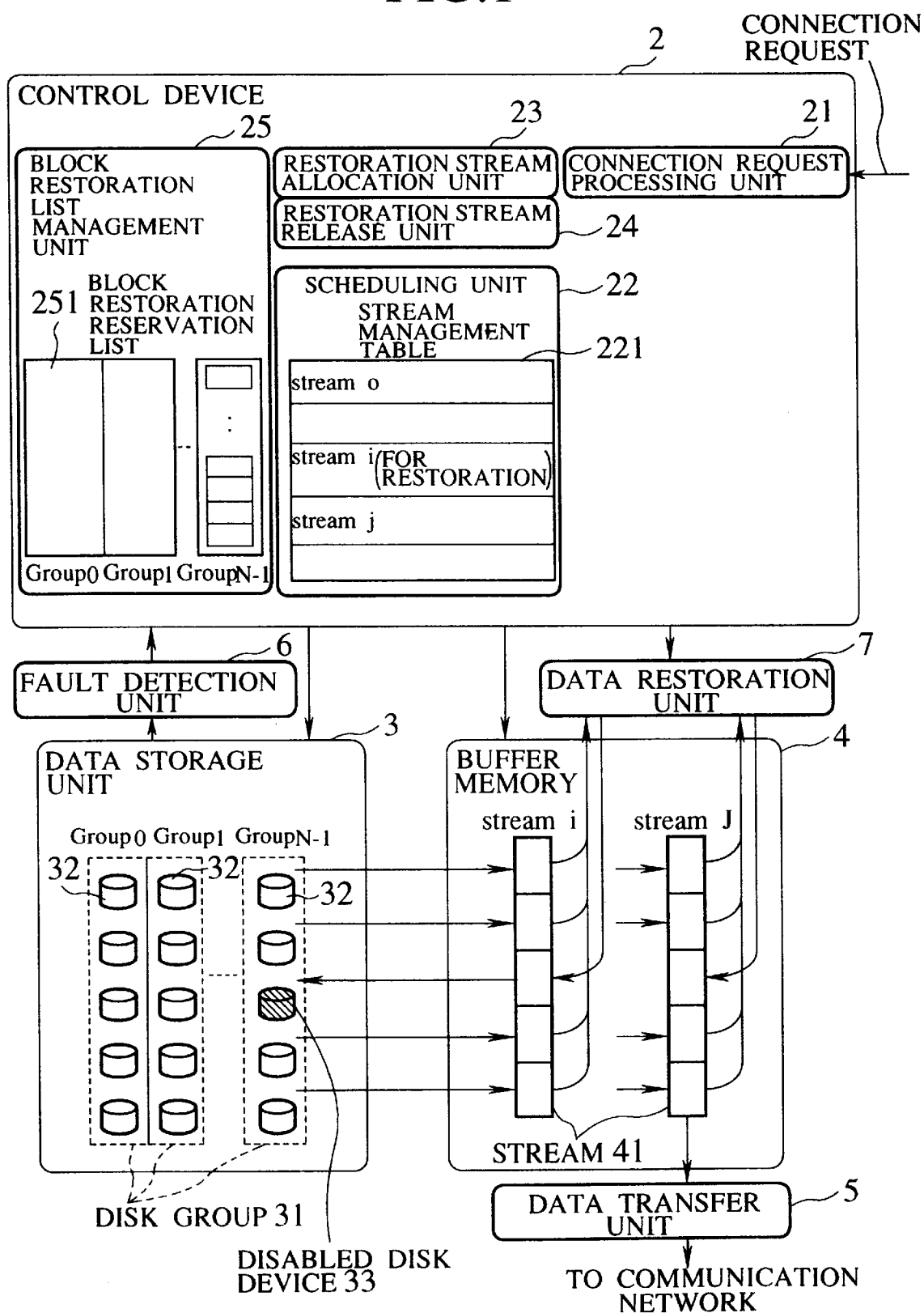
FIG. 1 is a block diagram of a real time stream server according to the present invention.

Now various embodiments of a real time stream server and a disk restoration scheme according to the present invention will be described with references to drawings.

First, the major features of each embodiment described in detail below will be briefly summarized.

In the first embodiment, when a fault in a disk device is detected and notified to a control device, a block restoration list management unit checks a block to which data segments to be restored belong, and creates a block restoration reservation list. This list has an information indicating a state of each block as either yet to be restored or in a process of being restored. In addition, the block restoration list management unit has a function to select a block to be restored next in response to an inquiry from a scheduling unit, and a function for judging whether a specified block is yet to be restored or not. Then, a whole or a part of the unused stream resources are allocated to a number of restoration streams corresponding to these available stream resources.

Here, the stream resources includes a time-slot for allocating a disk access, a buffer memory for temporarily storing data read out from a disk, and a memory region for storing information necessary in managing and scheduling streams in the control device.

The restoration stream obtains a block identifier from the block restoration reservation list corresponding to a disk group to be accessed next. Then, by using the scheduling scheme similar to that for the normal streams, the disk access and the data segment restoration on a buffer memory for that block are carried out, and the restored data segments are written into a spare disk.

When a new stream connection request arrives, in order to secure the stream resources necessary for the new stream, the restoration by a part of the restoration streams is interrupted and the corresponding stream resources are released.

Also, when a normal stream supply is finished and its stream resources are released, the released stream resources are allocated to the restoration stream.

By means of these measures, it becomes possible to maximally utilize the available stream resources not used by the normal stream supply, for the purpose of disk restoration, while changing a rate of the normal streams and the restoration streams in accordance with a new stream connection request.

In the second embodiment, in addition to the restoration by the restoration stream, the restored data are written into a spare disk at a time of data supply to a client by the normal stream. A scheduling unit inquires the block restoration list management unit as to whether a block is yet to be restored or not before a disk access to that block. In response, the block restoration list management unit checks the block restoration reservation list for a disk group which stores that block, and returns a response indicating whether that block is yet to be restored or not. In a case that block is yet to be restored, the scheduling unit writes the restored data segments on a buffer memory into the spare disk. At this point, the writing into the spare disk must be carried out while these data remain on the buffer memory, that is, before the transfer of that block to the client is finished. Also, the schedule must be set up to avoid a concentration of a plurality of simultaneous write operations with respect to the identical spare disk.

Note that, for the stream data currently supplied to the client, it can be expected that the supply and the restoration by that stream will continue subsequently, so that when the block restoration list management unit selects a next block to be restored by the restoration stream, it is effective to lower a selection priority level of a block storing the stream data currently supplied to the client, such that a block storing the stream data not currently supplied will be selected at a higher priority.

By means of these measures, it is possible to raise a probability for being able to utilize the data supplied by the normal stream for the restoration as well, and therefore it becomes possible to shorten the restoration time further.

In the third embodiment, the restored segments on the buffer memory are written into the spare disk at a time of data supply to the client by the normal stream similarly as in the second embodiment, even when the restored data cannot be written into the spare disk within a time until the end of the data transfer, as it is necessary to carry out the data supply to the client and the data restoration on the buffer memory simultaneously due to the limitation on hardware for carrying out the restoration on the buffer memory.

In this case, a staying time of data on the buffer memory is going to be different for the normal stream and the restoration stream, and consequently an amount of buffer memory utilization is going to be different for the normal stream and the restoration stream.

For this reason, at a time of new stream connection, a plurality of restoration streams are interrupted to release the stream resources if necessary, and the released stream resources are allocated to a new stream so as to secure the necessary stream resources for the supply of that stream.

On the contrary, when the data supply by the normal stream is finished, the stream resources used by the finished normal stream are released. Then, when an amount of unused stream resources reaches to an amount of stream resources required by one restoration stream, the available stream resources are allocated to a new restoration stream.

In the following, a normal stream which only carries out a supply of a stream will be referred to as an S stream. Namely, when a disk storing the transfer target block is disabled, the S stream carries out a supply of the stream while restoring that block, but the writing of the restored content of the disabled disk into the spare disk is not carried out.

On the other hand, a normal stream which carries out both a supply of a stream and a restoration of a disabled disk will be referred to as an RS stream. Namely, when a disk storing the transfer target block is disabled, the RS stream carried out a supply of the stream while restoring that block, and writes the restored content of the disabled disk into the spare disk as well.

Also, a stream which only carries out a restoration of a disabled disk will be referred to as an R stream.

First Embodiment

Now, with references to FIG. 1 and FIG. 2, the first embodiment of a real time stream server and a disk restoration scheme according to the present invention will be described in detail.

This first embodiment is directed to a case of using an S stream which restores data of a disabled disk while transmitting the restored data, and an R stream which restored data of a disabled disk and writes the restored data into a replacement disk.

Figure 2:
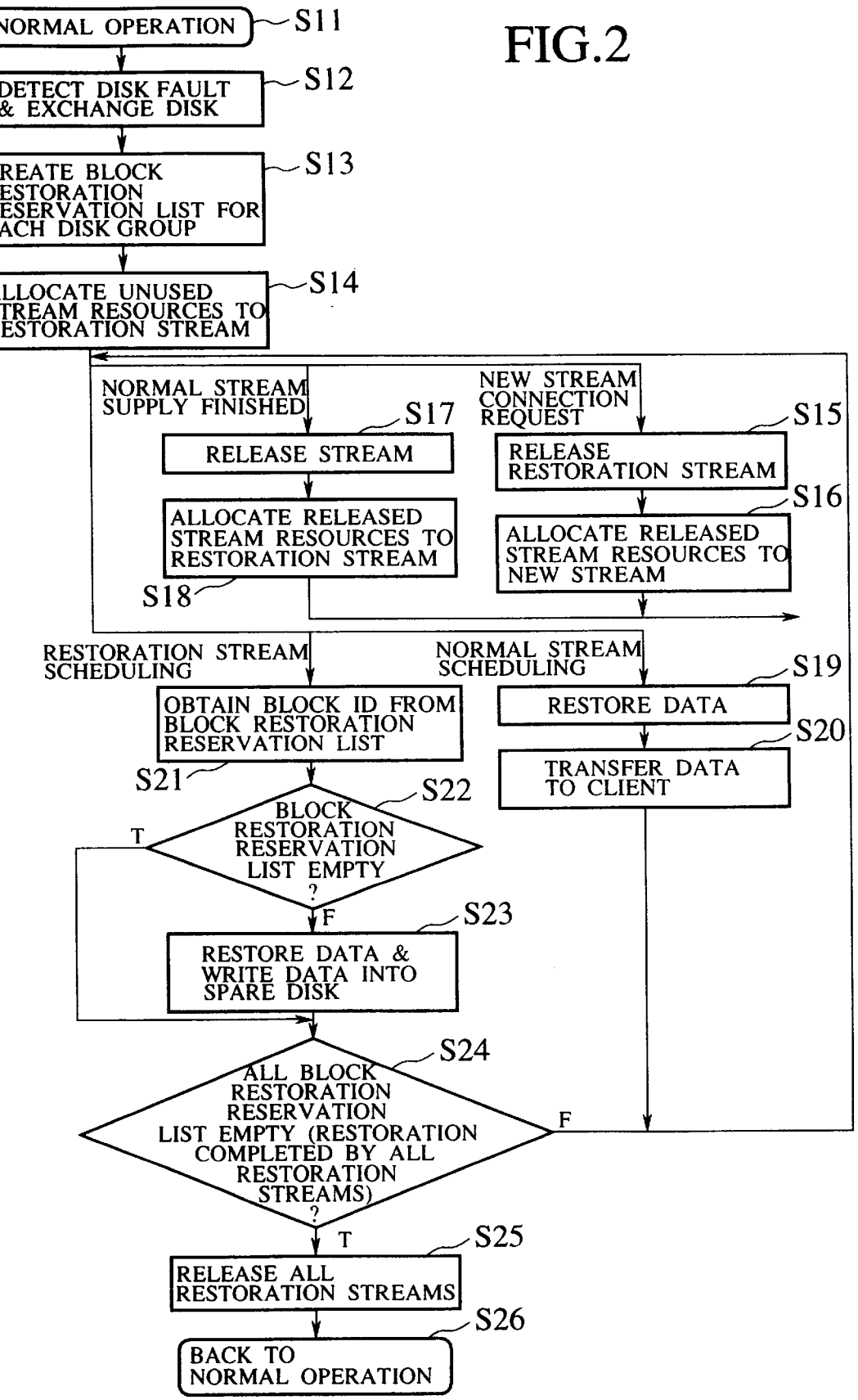
FIG. 2 is a flow chart of the operation by the real time stream server of FIG. 1 in the first embodiment of the present invention.

FIG. 1 shows a configuration of a real time stream server in this first embodiment, while FIG. 2 shows a flow chart for the operation of this real time stream server of FIG. 1.

As shown in FIG. 1, the real time stream server of this first embodiment has a data storage unit 3 having a plurality of disk devices 32 for storing real time stream data, a buffer memory 4 for temporarily storing data read out from the disk devices 32, a data transfer unit 5 for transferring data read out from the buffer memory 4 to a request source client through a network (not shown), a fault detection unit 6 for detecting a fault in the disk device 32, a data restoration unit 7 for restoring data of a disabled disk device 32, and a control device 2 for controlling an entire system by commanding necessary operations to the data storage unit 3 and the data transfer unit 5, etc.

The control device 2 includes a connection request processing unit 21 for receiving a stream connection request transmitted through a network from a request source client, a scheduling unit 22 for managing schedules of operations necessary in guaranteeing the continuity of each stream, a restoration stream allocation unit 23 for allocating stream resources to a restoration stream, a restoration stream release unit 24 for interrupting the restoration by the restoration stream and its releasing stream resources, and a block restoration list management unit 25 for managing restoration state, order, etc.

The data storage unit 3 has N sets of disk groups 31. Each disk group 31 contains (m+1) sets of disk devices 32, Among these (m+1) sets of disk devices 32, m sets are used for storing data, while one set is used as parity disk for storing parity. A block stored in one disk group 31 is divided into m pieces of data segments in equal length, which are respectively stored into different data storage disks. The parity disk stores a parity data for these m pieces of data segments.

In the control device 2, the scheduler 22 has a stream management table 221 having an entry for each stream, while the block restoration list management unit 25 has a block restoration reservation list for each disk group.

Note that, in FIG. 1, arrows around a stream i in the buffer memory 4 indicate a manner of restoring data of a disabled disk and writing restored data into a restored disk (a case of R stream), while arrows around a stream j in the buffer memory 4 indicate manners a manner of restoring data of a disabled disk and transmitting restored data to a client (a case of S stream).

Now, with reference to the flow chart of FIG. 2, the operation of the real time stream server of FIG. 1 in this first embodiment will be described.

In a case of normal operation (step S11) where a notice of a fault in the disk device is absent, when the stream connection request transferred through the network from the request source client is received at the connection request processing unit 21, the control device 2 allocates the stream resources, including an entry in the stream management table 221 of the scheduling unit 22, a time-slot for allocating a disk access, and a region of the buffer memory 4 for temporarily storing data read out from the disks, to the connection requested stream.

Then, in order to supply the request stream to the request source client, the control device 2 reads out m pieces of data segments and a corresponding one parity data within a corresponding disk group simultaneously onto the buffer memory 4, by using the allocated stream resources, and then sequentially transfers data read out from the buffer memory 4 at the data transfer unit 5 through the network to the request source client. The control device 2 transfers the data segments periodically, and when the supply of the requested stream is completed, the allocated stream resources are released.

Now, when a fault occurs in the disk device 32 during the normal operation, the following operation takes place.

Namely, the fault in the disk device 32 is detected by the fault detection unit 6, and a notice for a fault occurrence and a disk number of a disabled disk device 33 are sent to the control device 2, and in response, the disabled disk 33 is exchanged with a new disk device (step S12). Here, it is also possible to connect a spare disk device during the normal operation, and exchange the disk number of the disabled disk device 33 with the disk number of the spare disk device logically at a time of a fault occurrence.

Then, when the disabled disk device 33 is a disk device used for a stream currently supplied to the client, the control device 2 commands the data restoration unit 7 to restore the data segment to be read out from the disabled disk device 33 by using the other data segments and the parity data, before the data read out to the buffer memory 4 from the disk group (Group N-1 of FIG. 1, for example) to which the disabled disk device 33 belongs are transferred to the client (step S19), and then transfer the restored data to the client (stop S20).

On the other hand, when a fault is detected, the block restoration list management unit 25 creates a block restoration reservation list 251 for each disk group 31 (step S13) The block restoration reservation list 251 for each disk group 31 registers a block identifier for identifying a block stored in each disk group 31. For the disk group 31 without a disabled disk device 33, the block restoration reservation list 251 is empty.

Here, the block identifier contains a position information regarding a position of each segment on a respective disk device at a time of storing that block into the disk devices 32. This position information may be given in terms of logical block numbers, or physical track numbers and segment numbers. In a case where m pieces of segments of a certain block can be expressed by the identical logical block number in the respective disk devices, the block identifier can be given by that identical logical block number. Otherwise, the block identifier includes an information regarding a position on a respective disk device for each one of the m pieces of data segments.

The restoration stream allocation unit 23 then allocates a part or a whole of the stream resources currently not used for the supply of data to the client, to the restoration stream (step S14). More specifically, a region (a stream i portion in FIG. 1) in the buffer memory 4, an entry (a stream i entry in FIG. 1) in the stream management table 221 of the scheduling unit 22, and a time-slot for allocating a disk access are secured similarly as in a case of a normal stream, and the management information for the restoration stream is registered into the stream management table 221 while the disk access is allocated to the time-slot.

At the restoration stream, the block identifier is obtained from the block restoration reservation list 251 for the disk group to be accessed next (Group N-1 of FIG. 1, for example) (step S21). Then, unless this block restoration reservation list is empty (step S22), the data segments and the parity data corresponding to that block identifier are simultaneously read out to the buffer memory 4 similarly as in a case of the normal stream, and the data segment to be read out from the disabled disk 33 is restored by the data restoration unit 7, and then the restored data segment is written into an exchanged spare disk from the buffer memory 4 (step S23).

Here, by carrying out this writing by using a time-slot before the end of the block transfer of the normal stream, a period for which a region in the buffer memory 4 is occupied by one block will be the same as in a case of the normal stream, so that it becomes possible to carry out the restoration for all the disk groups sequentially block by block, by using a single restoration stream.

When the block restoration reservation list is empty (step S22 T), it is regarded as either there is no fault in the disk devices 32 or the restoration has been completed for that disk group, so that the reading, restoration, and writing operations are not carried out even when a time-slot for the disk access to that disk group comes around.

Now, when a connection request for a new stream is received during the restoration, a time-slot for allocating a disk access of a new stream is selected by regarding that the time-slot for the restoration stream does not exist. In a case where the disk access of the restoration stream is already allocated to the selected time-slot, the restoration by that restoration stream is interrupted, and its stream resources are released (step S15). At this point, all the block identifies indicating the blocks for which the writing by that restoration stream is not yet finished are registered into the respective block restoration reservation lists 251 of the corresponding disk groups again. Then, the released stream resources are allocated to the new stream. The disk access of the new stream is allocated to a vacated time-slot (step S16).

On the other hand, when the supply of the already connected stream is finished, the stream resources allocated to that stream are released (step S17) and the released stream resources are allocated to the restoration stream (step S18) so as to in crease a number of restoration streams.

Here, a time required for the restoration of data in one disk device is given by:

(restoration time)=(a number of restoration blocks in one disk device)×(a block transfer period)×(a number of disk groups)/(a number of restoration streams), and when (a block transfer time)=(a block transfer period) for all blocks, this restoration time is given by:

(restoration time)=(a transfer time for all data)/(a number of restoration streams).

Note that the restoration streams can be used for the restoration of all the disk groups, so that the restoration time does not change even when a number of disk groups containing the disabled disks increases.

When the restoration is completed by all the restoration streams or when all the block restoration reservation lists are empty (step S24 T), all the restoration streams are released (step S25), and the normal operation is resumed (step S26).

As described, according to this first embodiment, the available stream resources not used by the normal stream supply can be maximally utilized for the purpose of disk restoration, while a rate of the normal streams and the restoration streams can be changed in accordance with a new stream connection request.

Consequently, even during the restoration of data by the restoration stream, it is possible to shorten the restoration time for the lost data of the disabled disk device by effectively utilizing the transfer capacity of the disk group containing the disabled disk device, without affecting the supply of the already connected stream and setting any limitation on the Connection of a new stream.

Second Embodiment

Figure 3:
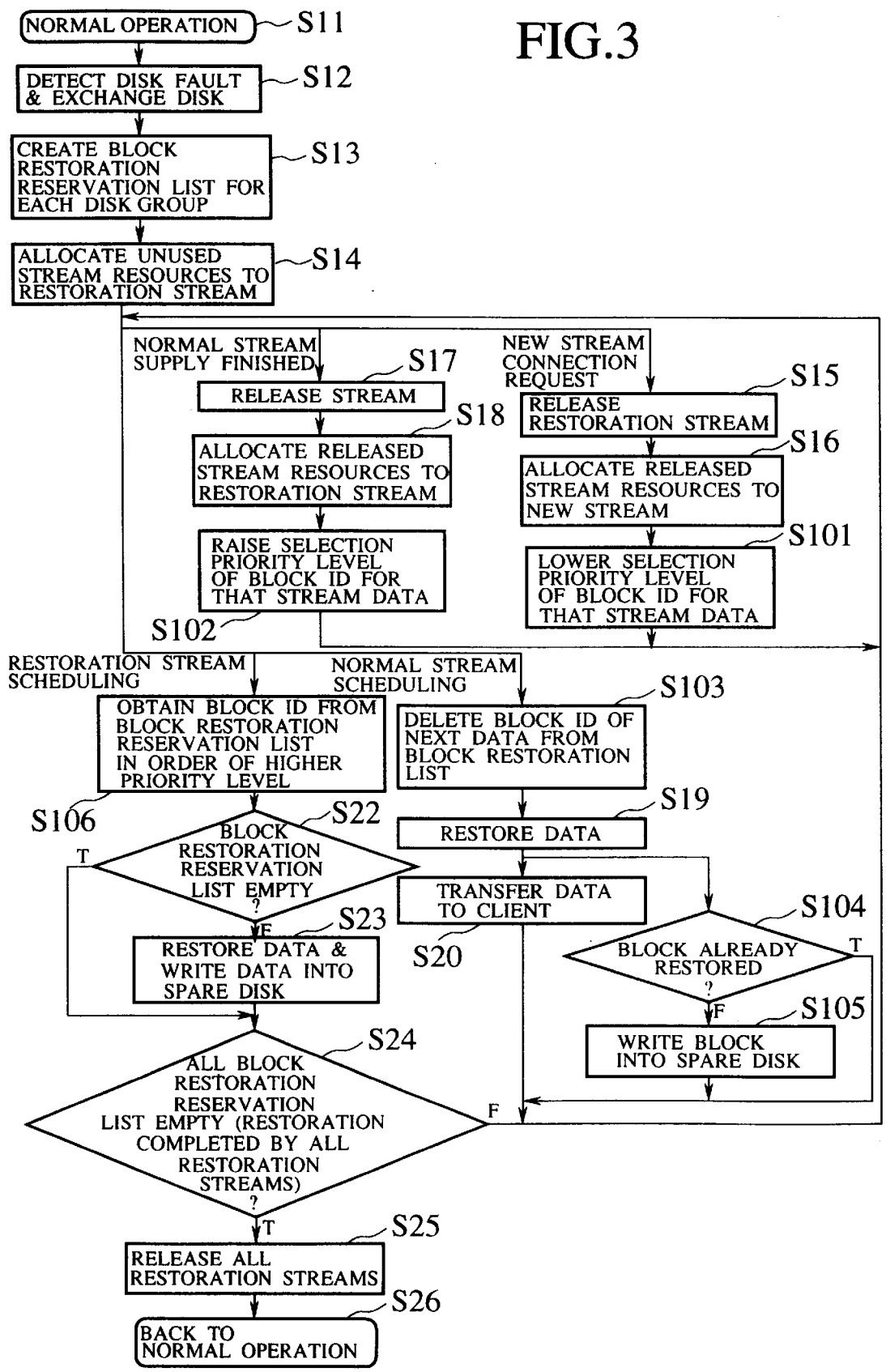
FIG. 3 is a flow chart of the operation by the real time stream server of FIG. 1 in the second embodiment of the present invention.

Now, with references to FIG. 3 and FIG. 4, the second embodiment of a real time stream server and a disk restoration scheme according to the present invention will be described in detail.

This second embodiment is directed to a case in which the normal stream during a supply of stream to the client is also utilized for the data restoration at the same time, in addition to the restoration of data of the disabled disk by the restoration stream as in the first embodiment. In other words, this second embodiment is directed to a case of using an RS stream and an R stream.

In this second embodiment, a configuration of a real time stream server is substantially the same as that shown in FIG. 1, except that the control device 2 has an additional control function regarding a restoration operation by the RS stream. FIG. 3 shows a flow chart for the operation of this real time stream server in this second embodiment, where steps which are substantially equivalent to the corresponding steps in the flow chart of FIG. 2 are given the same reference numerals, and the difference from the first embodiment of FIG. 2 will be mainly described in the following.

In the first embodiment, the data restoration is carried out on the buffer memory 4 for the purpose of supplying data to the client at the normal stream (step S19), and the block of the restored data is transferred to the client (step S20).

Here, the block of the restored data is held on the buffer memory 4 until the entire block is transferred to the client, and in this second embodiment, this block is written into the spare disk before that transfer is finished.

In this second embodiment, there is no need for the data segment already written into the spare disk to be written into the spare disk again by the normal stream, so that before the disk access, whether a block to be accessed next is yet to be restored or not is inquired to the block restoration list management unit 25. Then, if that block is yet to be restored as a result of this inquiry, the block identifier of that block is deleted from the block restoration reservation list (step S103). Then, the data restoration of the step S19 and the transfer of the step S20 are carried out.

Then, if that block is already restored as a result of the above inquiry (step S104 T), the writing into the spare disk is not carried out, whereas if that block is yet to be restored as a result of the above inquiry (step S104 F), that block is written into the spare disk before the transfer is finished (step S105).

The timing for writing into the spare disk must be scheduled so that it takes place while the data is held on the buffer memory 4, and a plurality of write operations to a single spare disk do not overlap. This can be done by scheduling the disk access (data reading), the data segment restoration (data restoration), the writing into the spare disk, and the transfer to client in a manner as shown in FIG. 4. Namely, the data segment restoration is completed within a certain time since the time-slot immediately after the disk access, and immediately after the data segment restoration, the writing into the spare disk is carried out. The overlap between the data segment restoration and the transfer to client is not permitted, but the overlap between the writing into the spare disk and the transfer to client is permitted.

Figure 4:
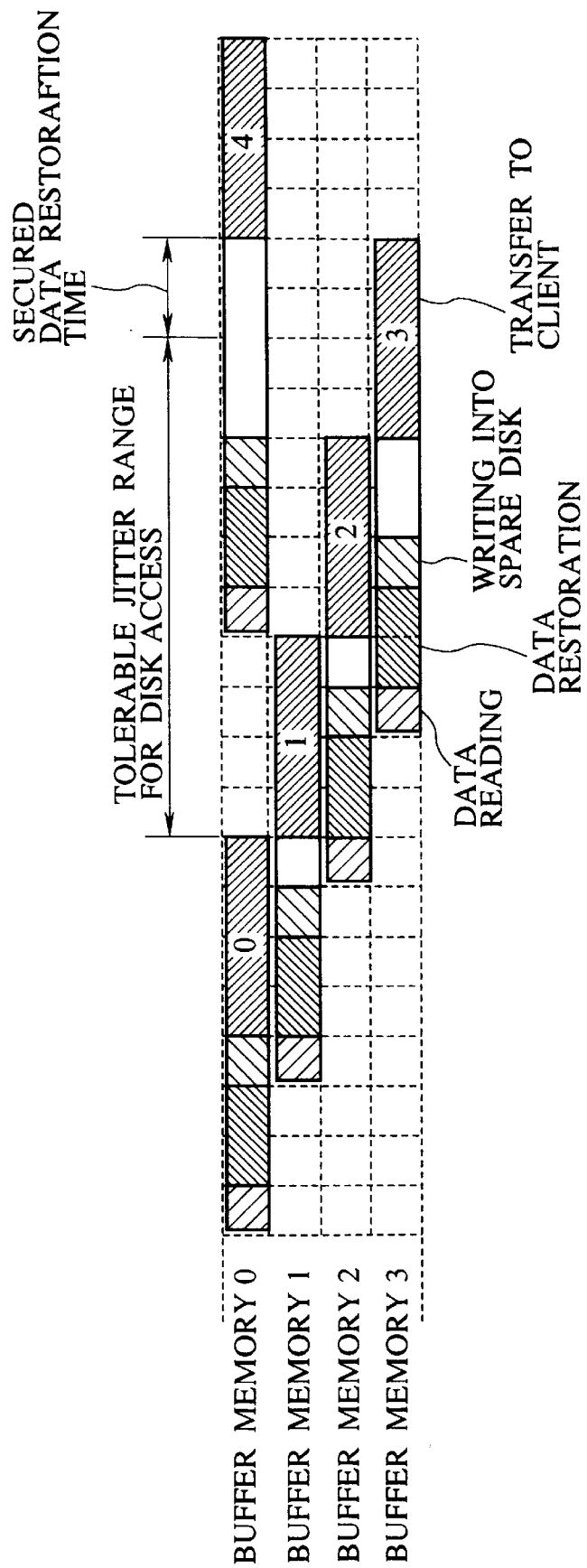
FIG. 4 is a timing chart for a normal stream used in the second embodiment of the present invention.

FIG. 4 shows an exemplary case in which four buffer memories are allocated to one stream, and the time required for transfer to client is four time-slots while the data restoration time is two time-slots. In this case, the tolerable jitter range indicating a range of time-slots to which the disk access can be allocated is ranging over 10 time-slots, from 12-th time-slot ahead of the start of the transfer to client until the second time-slot ahead of the start of the transfer to client. In this example, the writing into the spare disk of the corresponding disk group is carried out for all the blocks, but when the corresponding disk group does not have a disabled disk, there is no need to carry out the restoration on the buffer memory and the writing into the spare disk.

Now, in a case of using the normal stream for both the data supply and the data restoration as described above, a block that can be restored by the normal stream is limited only to the block which stores the stream data currently supplied. Even when that block is already restored by the restoration stream, it is impossible for that normal stream to restore another block. For this reason, in this second embodiment, the priority level of the block which stores the stream data currently supplied by the normal stream is lowered (step S101), while the priority level of the block which stores the stream data not currently supplied is raised (step S102), so that the block which stores the stream data not currently supplied will be selected at a higher priority at a time of selecting a block to be restored next by the restoration stream.

More specifically, at a time of creating the block restoration reservation list, two block restoration reservation lists of different types are produced for each disk group. The block identifiers of the blocks which store the stream data currently supplied are registered into one list (corresponding to the lowering of the priority level at the step S101), while the block identifiers of the other blocks which store the stream data not currently supplied are registered into the other list (corresponding to the raising of the priority level at the step S102).

The scheduling unit 22 inquires the block restoration list management unit 25 about a block to be restored next, by giving a disk group number of the disk group to be accessed next by one restoration stream. In response, the block restoration list management unit 25 takes out the block identifier registered at a top of the block restoration reservation list for the blocks of that disk group which are not currently supplied, and returns this block identifier to the scheduling unit 22. When this list is empty, the block identifier registered at the last of the block restoration reservation list for the blocks which are currently supplied (step S106). When both lists are empty, an empty block identifier is returned. In this case, the disk access, restoration, and writing operations by the restoration stream are not carried out.

When the data supply by the normal stream is finished, the block identifiers of the blocks for which the restoration was actually not carried out in the stream data of that stream are registered in the block restoration reservation list for the blocks currently supplied, so that all these block identifiers are moved to the block restoration reservation list for the blocks not currently supplied (corresponding to the raising of the priority level). On the contrary, when a supply by a new stream is started, the block identifiers of the blocks in the stream data of that stream are moved from the block restoration reservation list for the blocks not currently supplied to the block restoration reservation list for the blocks currently supplied (corresponding to the lowering of the priority level).

Note that the block restoration reservation list used in this second embodiment can be in any form other than that described above as long as the selection priority level of each block identifier can be identified. For example, it is also possible to record an information on a priority level in each block identifier itself, so that the priority level information can be referred by the block restoration list management unit 25 and there is no need to provide two lists of different types for each disk group as described above.

As described, according to this second embodiment, the available stream resources not used by the normal stream supply can be maximally utilized for the purpose of disk restoration, while a rate of the normal streams and the restoration streams can be changed in accordance with a new stream connection request.

Consequently, even during the restoration of data by the restoration stream, it is possible to shorten the restoration time for the lost data of the disabled disk device by effectively utilizing the transfer capacity of the disk group containing the disabled disk device, without affecting the supply of the already connected stream and setting any limitation on the connection of a new stream.

In addition, according to this second embodiment, the data which are not currently supplied are restored by the restoration stream, while the data which are currently supplied by the normal stream are directly utilized for the purpose of data restoration, so that the restoration completion time can be shortened further.

Third Embodiment

Now, with references to FIGS. 5A and 5B to FIG. 7, the third embodiment of a real time stream server and a disk restoration scheme according to the present invention will be described in detail.

In the first and second embodiments described above, the timings for the data restoration on the buffer memory and the writing into the spare disk are as shown in FIG. 4, where the data are restored before the transfer time for data transfer to client starts and the restored data are written into the spare disk before the transfer time ends.

By carrying out the above described restoration processing at this timing, a time for which data stay on the buffer memory for the R stream and the RS stream becomes equal to or less than the staying time of data on the buffer memory for the S stream. In other words, the amount of buffer memory utilization per one stream can be regarded as the same for three types of streams, that is, S stream, R stream, and RS stream.

However, depending on the hardware configuration, there are cases in which the timings for the data restoration and the data writing are going to be difference from those described above. For example, in a case of using the RAID3 as the data storage scheme and adopting a hardware configuration in which the transfer to the buffer memory is carried out from a top of the data, the writing into the spare disk is to be carried out after the transfer time for data transfer to client ends. This third embodiment is directed to an adaptation of the present invention to such cases.

Figure 5A:
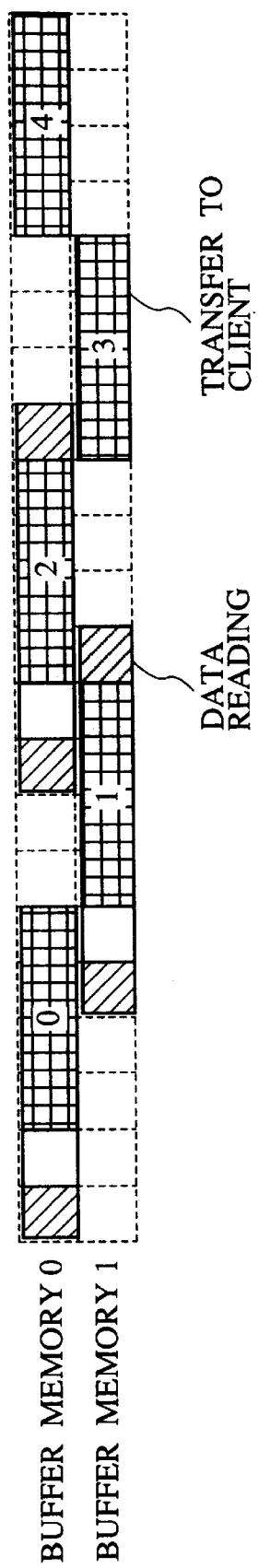
FIG. 5A is a timing chart for an S stream used in the third embodiment of the present invention.
Figure 5B:
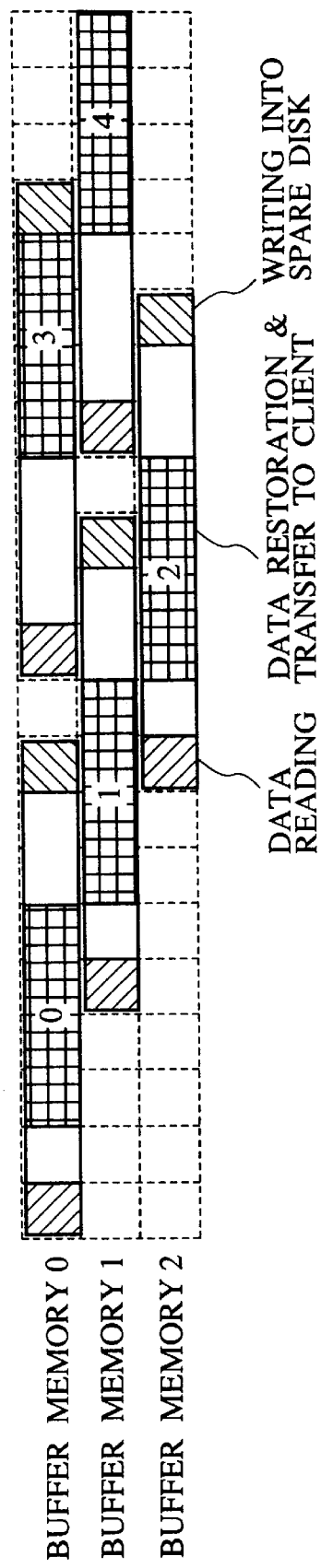
FIG. 5B is a timing chart for an RS stream used in the third embodiment of the present invention.

FIGS. 5A and 5B show the timing charts for the real time stream server in this third embodiment. FIG. 5A is a timing chart regarding the buffer memory utilization by the S stream, while FIG. 5B is a timing chart regarding the buffer memory utilization by the RS stream. Here, an exemplary case of allocating the buffer memory for two blocks part per one S stream is shown.

In a case of carrying out the data restoration by the timing as shown in FIG. 5B, the staying time of data on the buffer memory is longer for the RS stream and the R stream than for the S stream as much as a time for carrying out the writing into the spare disk. In other words, as far as the amount of buffer memory utilization per one stream is concerned, the RS stream and the R stream are going to require more resources than the S stream. The example shown in FIG. 5B is a case of using the buffer memory for three blocks part per one RS stream Here, when an amount Bs of resources used by one S stream, an amount Brs of resources used by one RS stream, and an amount Br of resources used by one R stream have the following relationship:

$$Br = Brs = n \times Bs,$$

at a time of changing a number of each type of streams dynamically, it is necessary for a number Ns of the S streams, a number Nrs of the RS streams, and a number Nr of the R streams should satisfy the following relationship:

$$N\max \geq Ns + n \times (Nrs + Nr)$$

where Nmax is a maximum number of streams.

In the first and second embodiments, in a case of operating according to the timings shown in FIG. 4 for example, n=1 so that when one S stream or RS stream is finished, one R stream can be executed by using the released resources. On the contrary, when a connection request for a new stream arrives, one S stream or RS stream can be supplied by releasing one R stream.

In contrast, in this third embodiment, in a case of operating according to the timings shown in FIG. 5 for example, the restoration becomes possible by increasing an available buffer memory region from two blocks part to three blocks part, so that by setting n=1.5, Ns+Nrs gives a number of streams for data supply and it is possible to dynamically determine Ns, Nrs and Nr within a range satisfying the above relationship.

Figure 6:
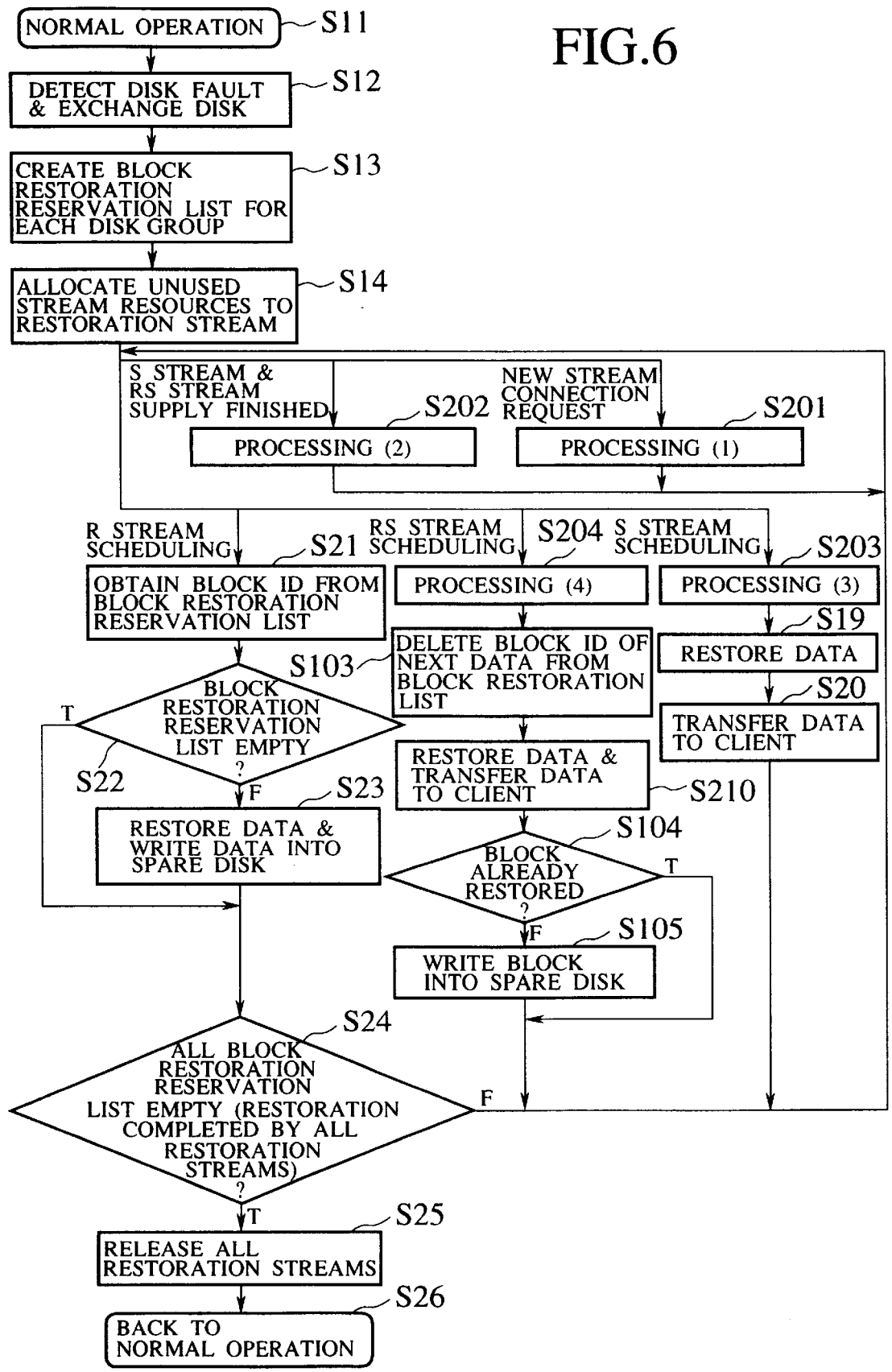
FIG. 6 is a flow chart of an exemplary operation by the real time stream server of FIG. 1 in the third embodiment of the present invention.

In this third embodiment, a configuration of a real time stream server is substantially the same as that shown in FIG. 1. FIG. 6 shows a flow chart for one exemplary operation of this real time stream server in this third embodiment, where steps which are substantially equivalent to the corresponding steps in the flow charts of FIG. 2 and FIG. 3 are given the same reference numerals, and the difference from the first embodiment of FIG. 2 and the second embodiment of FIG. 3 will be mainly described in the following.

In this third embodiment a use of the S stream is similar to the first embodiment, while a use of the RS stream is similar to the second embodiment, but for the RS stream, there is a difference from the second embodiment in that, the writing into the spare disk at the step S105 is carried out after the data restoration and the transfer to client are carried out at the step S210.

Also, this third embodiment differs from the first and second embodiments in that one normal stream is controlled to be dynamically switched between the S stream and the RS stream.

More specifically, the difference from the first and second embodiments lies in the following processing (1) to processing (4) which are carried out at the steps S201 to S204 respectively.

<Processing (1) at the step S201>

When a connection request for a new stream is received, first, whether to supply a new stream as the S stream or to supply a new stream as the RS stream while restoring a disabled disk at the same time is chosen according to a number of each type of streams.

When the restoration of a block to be transferred first in the requested stream data is not yet completed, and it is possible to secure as much as Brs of the stream resources from the unused stream resources or it is possible to secure as much as Brs of the stream resources by interrupting some R streams, a new stream is chosen to be the RS stream, and the stream resources are allocated to the new stream (after some R streams are interrupted if necessary).

Otherwise, the new stream is chosen to be the S stream. However, when the other RS stream exists and as much as Bs of the stream resources cannot be secured by just interrupting some R streams, the already existing RS stream is changed into the S stream and the resulting unnecessary stream resources (Brs–Bs) are released.

Note that when as much as Bs of the stream resources cannot be secured even by interrupting all the already existing R streams and RS streams, it is impossible to accept the connection request for a new stream.

<Processing (2) at the step S202>

When the data supply by the S stream or the RS stream is finished, the allocated stream resources are released. Then, the unused stream resources including the released stream resources are allocated to a new R stream.

<Processing (3) at the step 203>

During the data supply by the S stream, when a next block is yet to be restored and it is possible to secure as much as Brs of the stream resources by interrupting some R streams, these R streams are interrupted, and this S stream is changed into the RS stream.

<Processing (4) at the step S204>

During the data supply by the RS stream, when a block to be written into the spare disk by this RS stream is not present on the buffer memory, and a next block is already restored, this RS stream is changed into the S stream, and the resulting unnecessary stream resources (Brs–Bs) are released. Then, the unused stream resources including the released stream resources are allocated to a new R stream.

As described, according to this third embodiment, the available stream resources not used by the normal stream supply can be maximally utilized for the purpose of disk restoration, while a rate of the normal streams and the restoration streams can be changed in accordance with a new stream connection request.

Consequently, even during the restoration of data by the restoration stream, it is possible to shorten the restoration time for the lost data of the disabled disk device by effectively utilizing the transfer capacity of the disk group containing the disabled disk device, without affecting the supply of the already connected stream and setting any limitation on the connection of a new stream.

In addition, according to this third embodiment, the data which are not currently supplied are restored by the restoration stream, while the data which are currently supplied by the normal stream are directly utilized for the purpose of data restoration as much as possible, so that the restoration completion time can be shortened further.

Note that, in a case of interrupting the R stream because of the need for the stream resources, depending on a timing for interruption, there can be a case in which the stream resources have to be released before the read out data is restored on the buffer memory or before the restored data is written into the spare disk by that R stream. For this reason, when it is necessary to release the R stream, it is preferable to release the stream resources by sequentially interrupting the R streams, starting from such an R stream which has a smaller number of blocks for which the data reading is completed by the restoration/writing is not carried out yet.

Now, there is a possibility for an occurrence of a stream data in which unrestored blocks and restored blocks are mixed in a complicated way. If such a stream data is restored by the RS stream in the above described manner, the switching between the RS stream and the S stream would occur frequently so that many blocks in process of restoration would be wasted as the interrupted R stream occurs whenever the switching between the RS stream and the S stream occurs, and in addition, the overhead due to the switching between the RS stream and the S stream could be considerably large.

In a case where such a problem arises, it is preferable to modify the condition for changing the RS stream into the S stream in the processing (4) at the step S204 as follows, for example.

<Modified processing (4) at the step S204>

During the data supply by the RS stream, when L pieces of already restored blocks are supplied to the client consecutively, this RS stream is changed into the S stream, and the resulting unnecessary stream resources (Brs–Bs) are released. Then, the unused stream resources including the released stream resources are allocated to a new R stream.

By this modified processing, it is possible to suppress a number of switchings between the RS stream and the S stream.

Figure 7:
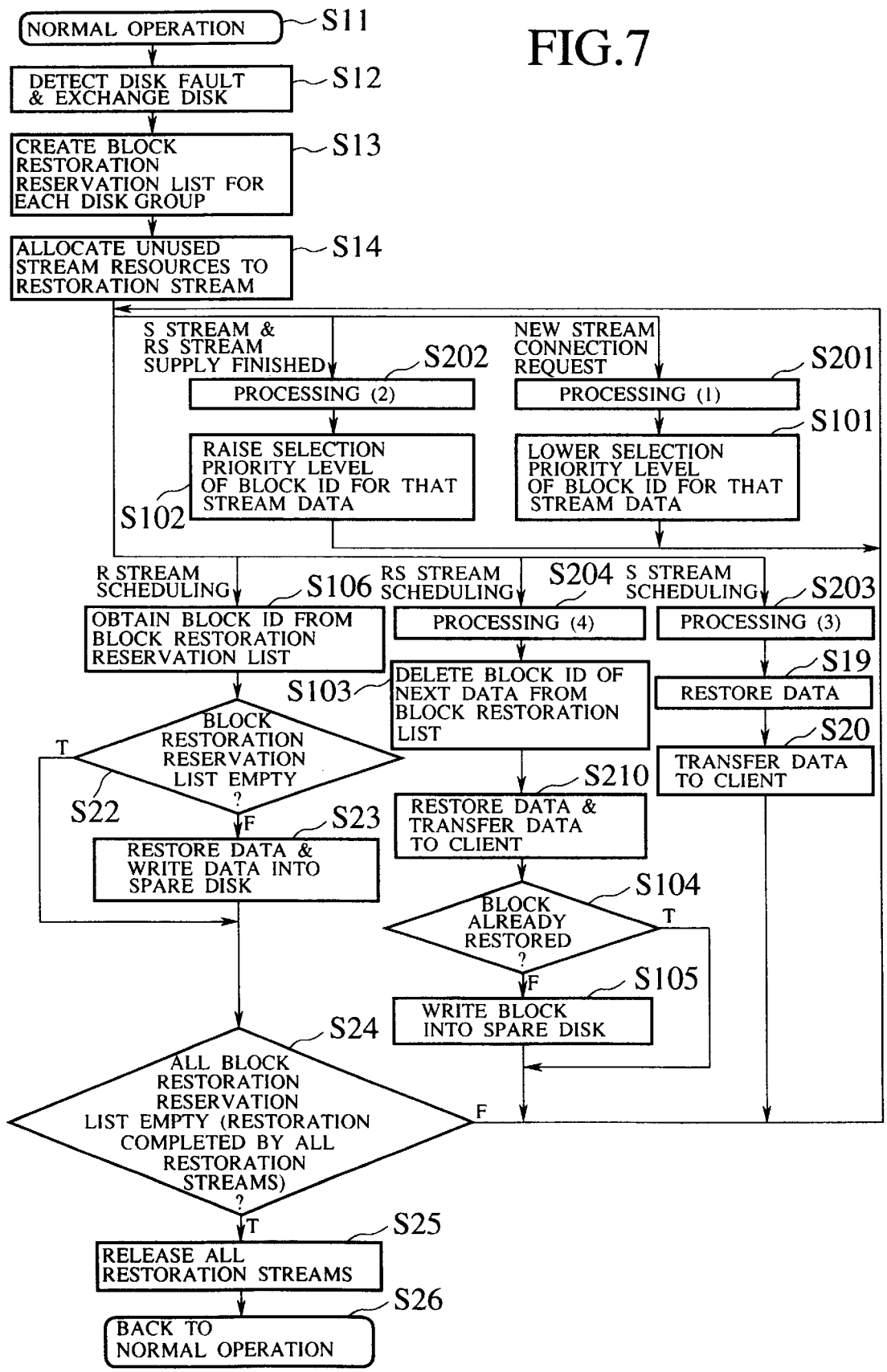
FIG. 7 is a flow chart of a modified operation by the real time stream server of FIG. 1 in the third embodiment of the present invention.

Note that FIG. 6 shows a procedure in a case where the selection priority level of the block to be restored is not used, but it is also possible to use the selection priority level of the block to be restored similarly as in the second embodiment. FIG. 7 shows an exemplary procedure in such a modified case of the third embodiment. In this third embodiment, the normal stream includes the S stream which does not carry out the writing into the spare disk and the RS stream which does carry out the writing into the spare disk, but in this modified case, the selection priority level of the stream data supplied by each normal stream is lowered, uniformly regardless of whether the stream data are supplied by the S stream or by the RS stream.

Moreover, in this third embodiment, it is also possible to use the RS stream fixedly without using the S stream as in the second embodiment. In such a case, it suffices to delete the portion related to the S stream from the procedure shown in FIG. 6 or FIG. 7.

In addition, in the second embodiment in which the data is restored before the transfer time for data transfer to client starts and the writing into the spare disk is carried out before the transfer time ends, when the resources required for the RS stream exceeds the resources required for the S stream, it is also possible to modify the second embodiment to incorporate the dynamical switching of the S stream and the RS stream used in this third embodiment.

As described, according to the present invention, the blocks to be restored are managed by creating lists, and the stream resources are allocated to the normal streams at a higher priority by interrupting the restoration streams according to the need, while the unused stream resources are allocated to the restoration streams as much as possible, and the the restoration streams restore blocks according to the aforementioned lists, so that even during the restoration of data by the restoration stream, it is possible to shorten the restoration time for the lost data of the disabled disk device by effectively utilizing the stream resources, without affecting the supply of the already connected stream and setting any limitation on the connection of a new stream.

In addition, when the data which are not currently supplied are restored by the restoration stream, while the data which are currently supplied by the normal stream are directly utilized for the purpose of data restoration, the restoration completion time can be shortened further.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A real time stream server, comprising:
    a data storage unit having a plurality of disk devices for storing each block constituting stream data, each block being formed by a prescribed number of data segments and a parity segment which are stored in different disk devices;
    a buffer memory for temporary storing the stream data read out from the data storage unit;
    a transfer unit configured to transfer the stream data from the buffer memory to a client through a network, by using at least a part of stream resources according to a currently accepted request from the client, the stream resources being resources of the real time stream server including regions of the buffer memory that are to be allocated to each stream within the real time stream server at a time when executing each stream;
    a data restoration unit configured to restore a segment stored in a disabled disk device and writing the restored segment into a replacement disk device; and
    a control unit configured to control operations of the transfer unit and the data restoration unit by using normal streams for data transfer and restoration streams for data restoration, wherein the control unit allocates as many of the stream resources as required for the currently accepted request to the normal streams first and then allocates at least a part of a reminder of the stream resources to the restoration streams such that the stream resources are allocated to the restoration streams variably and the normal streams are executed while the restoration streams are executed until the data restoration is completed, using respectively allocated stream resources.

2. The real time stream server of claim 1, wherein when a connection request for a new stream is received, the control means interrupts the data restoration by at least a part of the restoration streams to release the stream resources allocated to said at least a part of the restoration streams, and allocates released stream resources to the new stream.

3. The real time stream server of claim 1, wherein when a data supply by one normal stream is finished, the control means releases the stream resources allocated to said one normal stream and allocates released stream resources to at least one stream for data restoration.

4. The real time stream server of claim 1, wherein the control means manages a block information indicating a block containing a segment to be restored, and the data restoration means is controlled to restore the segment stored in the disabled disk device within a block identified by the block information.

5. The real time stream server of claim 4, wherein the data restoration means reads out segments belonging to the block identified by the block information from the data storage unit, restores the segment stored in the disabled disk device on the buffer memory, and writes the restored segment from the buffer memory into the replacement disk device.

6. The real time stream server of claim 4, wherein the control means checks the block information to judge whether a block to be transferred next is yet to be restored or not prior to a transfer of the block to be transferred next, and when the block to be transferred next is yet to be restored, the control means controls operations of the transfer means and the data restoration means by using RS streams in which the data restoration means reads out segments belonging to the block identified by the block information from the data storage unit, restores the segment stored in the disabled disk device within the block identified by the block information on the buffer memory before a transfer to the client starts, and writes the restored segment from the buffer memory into the replacement disk device while the transfer means transfers a block containing the restored segment from the buffer memory to the client through the network.

7. The real time stream server of claim 4, wherein the control means checks the block information to judge whether a block to be transferred next is yet to be restored or not prior to a transfer of the block to be transferred next, and when the block to be transferred next is yet to be restored, the control means controls operations of the transfer means and the data restoration means by using RS streams in which the data restoration means reads out segments belonging to the block identified by the block information from the data storage unit, restores the segment stored in the disabled disk device within the block identified by the block information on the buffer memory while the transfer means transfers a block containing the restored segment from the buffer memory to the client through the network, and writes the restored segment from the buffer memory into the replacement disk device after the transfer means finishes the transfer.

8. The real time stream server of claim 1, wherein when a block to be transferred next is yet to be restored and necessary stream resources for an RS (Restoration and Supply) stream are available, where the RS stream is for transferring block while restoring a segment to be restored and writing restored segment into the replacement disk device, the control means changes a normal stream into the RS stream.

9. The real time stream server of claim 1, wherein the control means controls operations of the transfer means and the data restoration means by using RS (Restoration and Supply) streams where the RS stream is for transferring block while restoring a segment to be restored and writing restored segment into the replacement disk device.

10. The real time stream server of claim 9, wherein when the RS stream is used, the data restoration means reads out segments belonging to a block containing a segment to be restored from the data storage unit and restores the segment stored in the disabled disk device within said block on the buffer memory, and the transfer means transfers a block containing the restored segment from the buffer memory to the client through the network.

11. The real time stream server of claim 9, wherein a block to be restored next in the restoration stream is selected according to a selection priority level of each block, and the control means lowers the selection priority level of all blocks corresponding to the stream data currently supplied to the client.

12. A method for controlling a real time stream server formed by: a data storage unit having a plurality of disk devices for storing each block constituting stream data, each block being formed by a prescribed number of data segments and a parity segment which are stored in different disk devices; a buffer memory for temporarily storing the stream data read out from the data storage unit; a transfer unit for transferring the stream data from the buffer memory to a client through a network, by using at least a part of stream resources according to a currently accepted request from the client, the stream resources being resources of the real time stream server including regions of the buffer memory that are to be allocated to each stream within the real time stream server at a time when executing each stream; a data restoration unit for restoring a segment stored in a disabled disk device and writing the restored segment into a replacement disk device; the method comprising the steps of:

allocating as many of the stream resources as required for the currently accepted request to normal streams for data transfer first, and then allocating at least a part of a remainder of the stream resources to restoration streams for data restoration such that the stream resources are allocated to the restoration streams variably; and executing the normal streams while also executing the restoration streams until the data restoration is completed, using respectively allocated stream resources.

13. The method of claim 12, wherein when a connection request for a new stream is received, the controlling step interrupts the data restoration by at least a part of the restoration streams to release the stream resources allocated to said at least a part of the restoration streams, and the allocating step allocates released stream resources to the new stream.

14. The method of claim 12, wherein when a data supply by one normal stream is finished, the controlling step releases the stream resources allocated to said one normal stream and the allocating step allocates released stream resources to at least one stream for data restoration.

15. The method of claim 12, wherein the controlling step manages a block information indicating a block containing a segment to be restored, and controls the data restoration unit to restore the segment stored in the disabled disk device within a block identified by the block information.

16. The method of claim 15, wherein the controlling step controls the data restoration unit to read out segments belonging to the block identified by the block information from the data storage unit, restore the segment stored in the disabled disk device on the buffer memory, and write the restored segment from the buffer memory into the replacement disk device.

17. The method of claim 15, wherein the controlling step checks the block information to judge whether a block to be transferred next is yet to be restored or not prior to a transfer of the block to be transferred next, and when the block to be transferred next is yet to be restored, the controlling step controls operations of the transfer unit and the data restoration unit by using RS streams in which the data restoration unit reads out segments belonging to the block identified by the block information from the data storage unit, restores the segment stored in the disabled disk device within the block identified by the block information on the buffer memory before a transfer to the client starts, and writes the restored segment from the buffer memory into the replacement disk device while the transfer unit transfers a block containing the restored segment from the buffer memory to the client through the network.

18. The method of claim 15, wherein the controlling step checks the block information to judge whether a block to be transferred next is yet to be restored or not prior to a transfer of the block to be transferred next, and when the block to be transferred next is yet to be restored, the controlling step controls operations of the transfer unit and the data restoration unit by using RS streams in which the data restoration unit reads out segments belonging to the block identified by the block information from the data storage unit, restores the segment stored in the disabled disk device within the block identified by the block information on the buffer memory while the transfer unit transfers a block containing the restored segment from the buffer memory to the client through the network, and writes the restored segment from the buffer memory into the replacement disk device after the transfer unit finishes the transfer.

19. The method of claim 12, wherein when a block to be transferred next is yet to be restored and necessary stream resources for an RS (Restoration and Supply) stream are available, where the RS stream is for transferring block while restoring a segment to be restored and writing restored segment into the replacement disk device, the controlling step changes a normal stream into the RS stream.

20. The method of claim 12, wherein the controlling step controls operations of the transfer unit and the data restoration unit by using RS streams where the RS stream is for transferring block while restoring a segment to be restored and writing restored segment into the replacement disk device.

21. The method of claim 20, wherein when the RS stream is used, the data restoration means reads out segments belonging to a block containing a segment to be restored from the data storage unit and restores the segment stored in the disabled disk device within said block on the buffer memory, and the transfer means transfers a block containing the restored segment from the buffer memory to the client through the network.

22. The method of claim 20, wherein a block to be restored next in the restoration stream is selected according to a selection priority level of each block, and the controlling step lowers the selection priority level of all blocks corresponding to the stream data currently supplied to the client.

* * * * *